US009139384B2

(12) United States Patent
Brooks, IV et al.

(10) Patent No.: US 9,139,384 B2
(45) Date of Patent: Sep. 22, 2015

(54) TRACK-MOUNTED WHEEL RESTRAINT SYSTEMS

(71) Applicants: Andrew Brooks, IV, Thiensville, WI (US); Benjamin Wieberdink, Cedar Grove, WI (US); Bradley J. Stone, Port Washington, WI (US); Norbert Hahn, Franklin, WI (US); Steve Fleischman, Oak Creek, WI (US); Timothy Cotton, Milwaukee, WI (US)

(72) Inventors: Andrew Brooks, IV, Thiensville, WI (US); Benjamin Wieberdink, Cedar Grove, WI (US); Bradley J. Stone, Port Washington, WI (US); Norbert Hahn, Franklin, WI (US); Steve Fleischman, Oak Creek, WI (US); Timothy Cotton, Milwaukee, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 150 days.

(21) Appl. No.: 13/785,978

(22) Filed: Mar. 5, 2013

(65) Prior Publication Data

US 2014/0255134 A1 Sep. 11, 2014

(51) Int. Cl.
*B60T 3/00* (2006.01)
*B65G 69/00* (2006.01)

(52) U.S. Cl.
CPC .................. *B65G 69/005* (2013.01)

(58) Field of Classification Search
USPC .............. 188/4 R, 32; 414/401, 410
See application file for complete search history.

(56) References Cited

U.S. PATENT DOCUMENTS

| 5,582,498 | A | 12/1996 | Springer et al. |
| 5,762,459 | A | 6/1998 | Springer et al. |
| 5,882,167 | A | 3/1999 | Hahn et al. |
| 6,082,952 | A | * 7/2000 | Alexander .................. 414/401 |
| 6,092,970 | A | 7/2000 | Hahn et al. |
| 6,116,839 | A | 9/2000 | Bender et al. |
| 6,190,109 | B1 | 2/2001 | Bender |

(Continued)

FOREIGN PATENT DOCUMENTS

| DE | 2735826 | 2/1979 |
| DE | 4120035 | 12/1992 |

(Continued)

OTHER PUBLICATIONS

International Bureau, "International Search Report," issued in connection with International patent application No. PCT/US2014/019825, mailed on Jun. 2, 2014, 5 pages.

(Continued)

*Primary Examiner* — Christopher Schwartz
(74) *Attorney, Agent, or Firm* — Hanley, Flight & Zimmerman, LLC

(57) ABSTRACT

Example manual wheel restraint systems and methods for restraining a vehicle at a loading dock include are disclosed herein. An example wheel restraint disclosed herein includes a retractable wheel-blocking barrier mounted to a carrier that can be repositioned along a track, where the track is anchored to a driveway of a loading dock. The track runs generally parallel to a vehicle path that a wheel of a vehicle travels along as the vehicle backs into the dock. To block a rear wheel of the vehicle parked at the dock, the barrier extends laterally into the wheel path, adjacent or in front of the wheel. To release the vehicle, the barrier retracts out from within the wheel path. In some examples, to ensure that the vehicle is secured, the barrier and/or the carrier include barrier or carrier catches to help hold the barrier and carrier in a fixed position. In some examples, one or more sensors determine or sense whether the catches are secured or released and generate signals accordingly. The signals, in some examples, alert dock personnel of the condition of the catches.

37 Claims, 11 Drawing Sheets

(56) References Cited

U.S. PATENT DOCUMENTS

| | | | |
|---|---|---|---|
| RE37,570 E * | 3/2002 | Springer et al. | 414/401 |
| 6,390,245 B1 | 5/2002 | Metz | |
| 6,524,053 B2 | 2/2003 | Hahn et al. | |
| 6,676,360 B2 | 1/2004 | Springer et al. | |
| 7,000,740 B2 | 2/2006 | Chrisco et al. | |
| 7,040,461 B2 | 5/2006 | Chrisco et al. | |
| 7,226,265 B2 | 6/2007 | Wilson | |
| 7,841,823 B2 | 11/2010 | Sveum et al. | |
| 8,006,811 B2 | 8/2011 | Andersen et al. | |
| 8,307,956 B2 | 11/2012 | Andersen et al. | |
| 2002/0141852 A1 | 10/2002 | Hahn et al. | |
| 2008/0124203 A1 * | 5/2008 | McDonald | 414/401 |
| 2009/0194375 A1 | 8/2009 | Andersen et al. | |
| 2009/0194376 A1 | 8/2009 | Brooks et al. | |
| 2010/0170754 A1 * | 7/2010 | Brooks et al. | 188/32 |
| 2011/0162916 A1 | 7/2011 | Saliger et al. | |
| 2011/0240416 A1 | 10/2011 | Brooks et al. | |
| 2013/0292214 A1 | 11/2013 | Brooks et al. | |

FOREIGN PATENT DOCUMENTS

| | | |
|---|---|---|
| EP | 0284532 | 9/1988 |
| FR | 2736336 | 1/1997 |
| WO | 9702201 | 1/1997 |
| WO | 9719875 | 6/1997 |
| WO | 9749625 | 12/1997 |

OTHER PUBLICATIONS

International Bureau, "Written Opinion of the International Searching Authority," issued in connection with International patent application No. PCT/US2014/019825, mailed on Jun. 2, 2014, 6 pages.

* cited by examiner

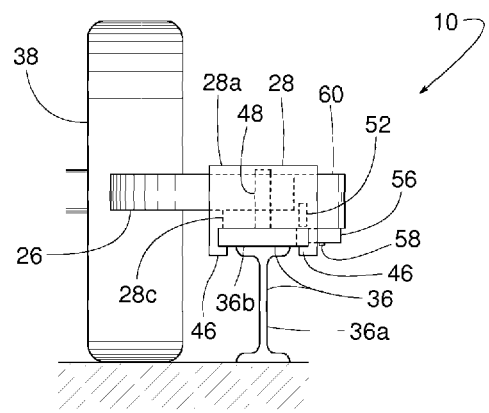
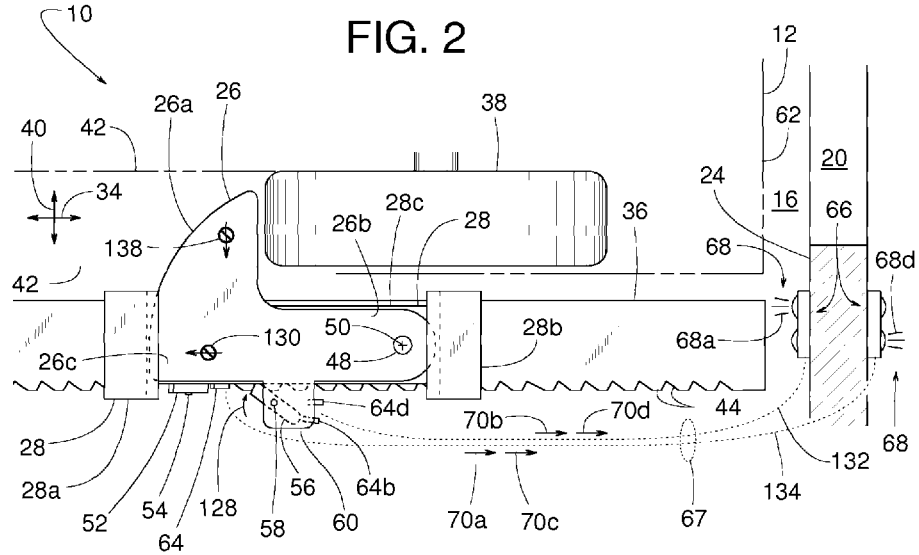

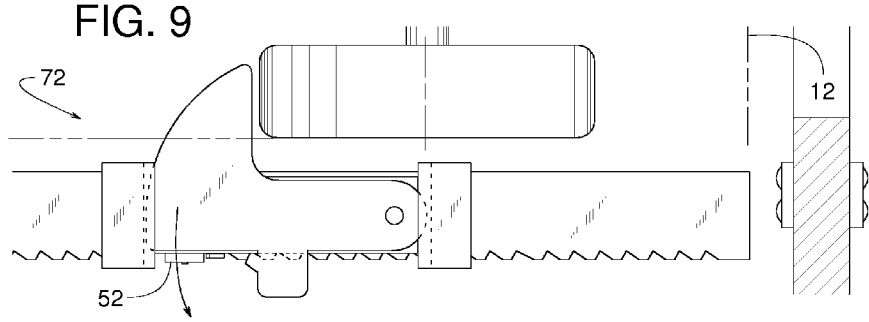
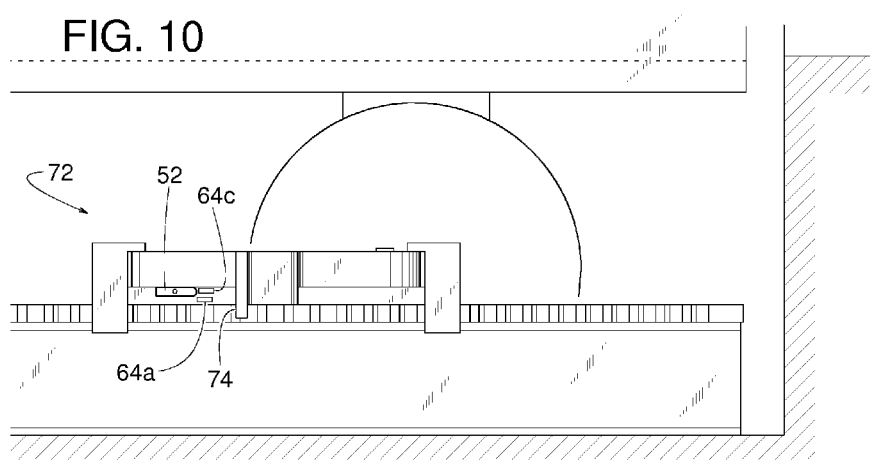
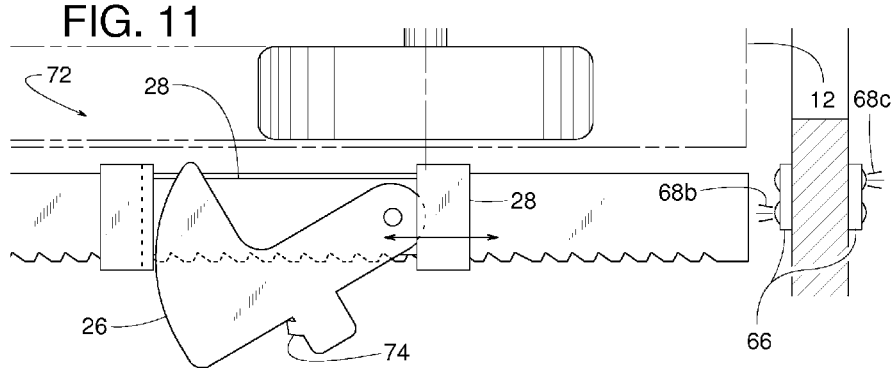

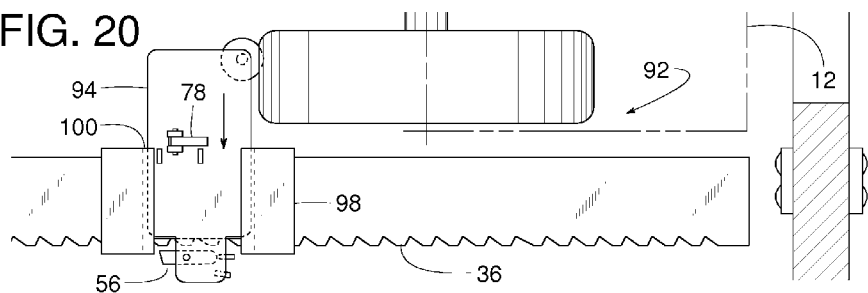
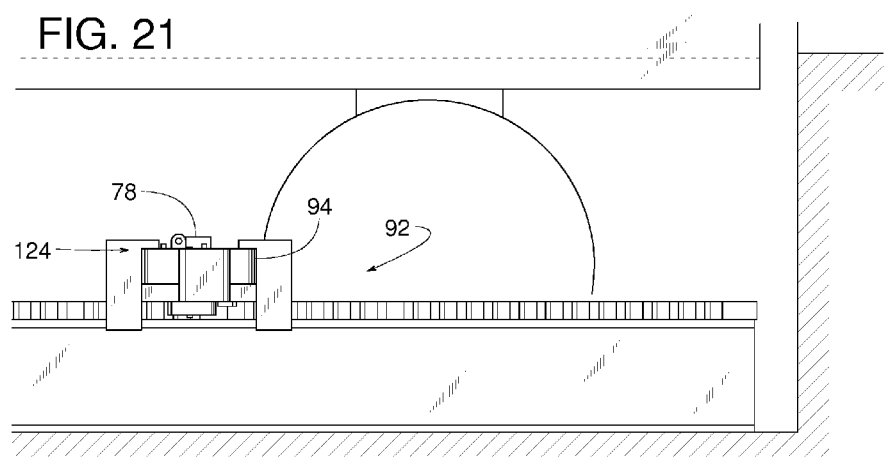
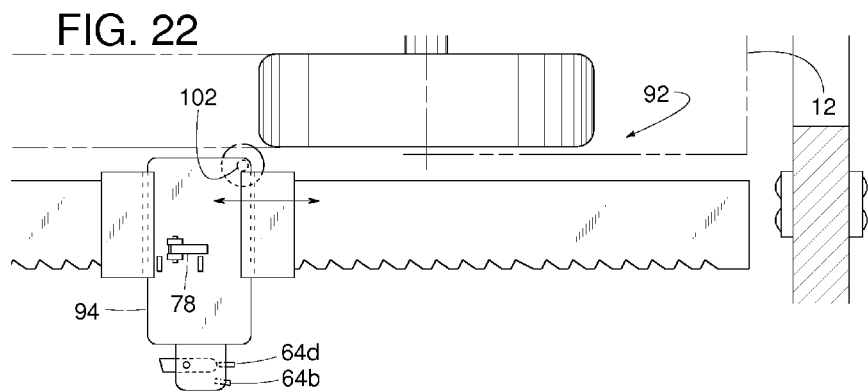

US 9,139,384 B2

TRACK-MOUNTED WHEEL RESTRAINT SYSTEMS

FIELD OF THE DISCLOSURE

This patent generally pertains to wheel restraints and, more specifically, to track-mounted wheel restraint systems.

BACKGROUND

A typical loading dock of a building includes an exterior doorway with an elevated platform for loading and unloading vehicles, such as trucks and trailers. When cargo is being transferred between the vehicle and the platform, it is generally safe practice to restrain the vehicle by some means to prevent the vehicle from accidentally departing the dock prematurely.

Perhaps the simplest vehicle restraint is a portable wheel chock that is manually wedged in front of a vehicle's wheel to obstruct the vehicle's forward movement. Examples of portable wheel chocks are disclosed in U.S. Pat. Nos. 6,390,245; 7,000,740; 7,040,461 and 7,226,265.

Some example vehicle restraints are permanently mounted to the dock and have a hook that engages the front edge of a truck or trailer's rear impact guard (also known as an ICC bar). Examples of such vehicle restraints are disclosed in U.S. Pat. Nos. 5,882,167; 6,116,839; 6,190,109 and 7,841,823.

Other vehicle restraints, such as those that are sometimes referred to as "wheel restraints," are mounted to the loading dock's driveway and have an arm or wheel-blocking barrier that moves in front of a rear wheel of the vehicle to create an obstruction that inhibits the vehicle from departing from the dock prematurely. Examples of such wheel restraints are disclosed in U.S. Pat. Nos. 5,762,459; 5,582,498; 6,092,970; 6,676,360; 8,006,811 and 8,307,956 and in US patent publications 2011/0162916 and 2009/0194376.

BRIEF DESCRIPTION OF THE DRAWINGS

FIG. 1 is an end view of an example wheel restraint system constructed according to the teachings disclosed herein.

FIG. 2 is a top view of FIG. 1.

FIG. 9 is a top view similar to FIG. 7, but showing a carrier catch of the example wheel restraint of FIGS. 7 and 8 in a release position and a barrier catch of the example the wheel restraint.

FIG. 10 is a front side view of FIG. 9.

FIG. 11 is a top view similar to FIGS. 7 and 9, but showing the barrier of the example wheel restraint of FIGS. 7-9 in a retracted position.

FIG. 20 is a top view similar to FIG. 18, but showing a carrier catch of the example wheel restraint of FIGS. 17-19 in a release position and a barrier catch of the example wheel restraint in a second position.

FIG. 21 is a front view of FIG. 20.

FIG. 22 is a top view similar to FIG. 20, but showing the barrier in a retracted position.

DETAILED DESCRIPTION

Figure 3:
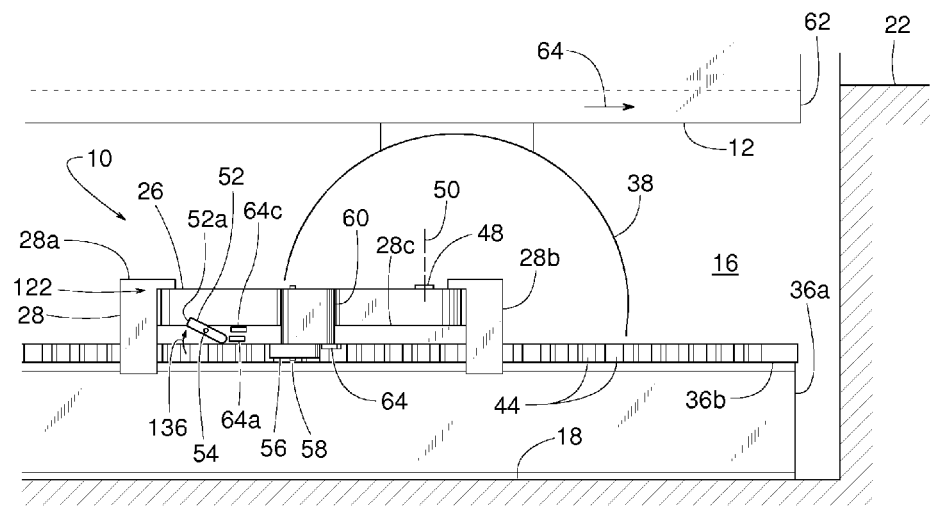
FIG. 3 is a front side view of FIG. 1.

FIGS. 1-6 show an example wheel restraint system 10 constructed in accordance with the teachings disclosed herein. The wheel restraint system 10 of the illustrated example secures a vehicle 12 (e.g., truck, trailer, etc.) being loaded or unloaded of cargo at a loading dock 14. In the illustrated example, a dock 16 comprises a driveway 18 that leads to a doorway 20 and an elevated platform 22 of a building 24. When cargo is being transferred between the platform 22 and the vehicle 12, the wheel restraint system 10 helps prevent the vehicle 12 from accidentally departing prematurely.

Figure 6:
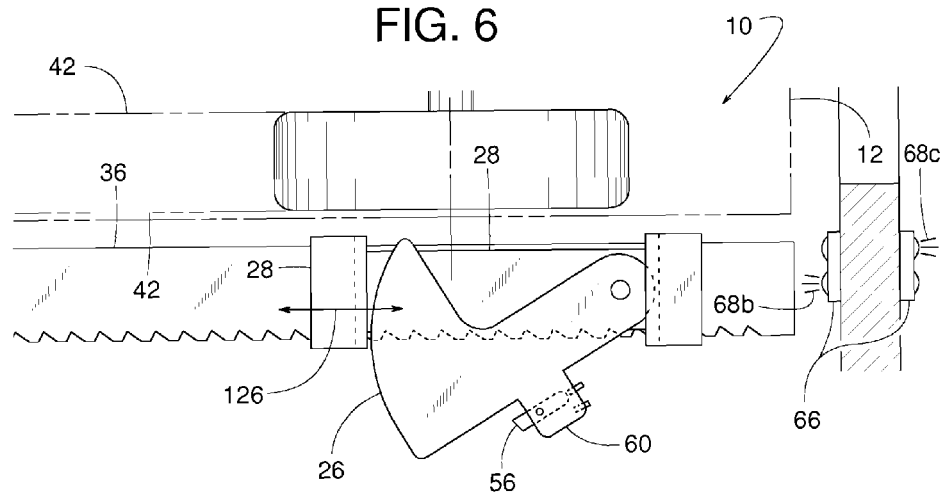
FIG. 6 is a top view similar to FIGS. 2 and 4, but showing the barrier of the example wheel restraint in a retracted position.

In some examples, the wheel restraint system 10 comprises a retractable wheel-blocking barrier 26 mounted to a carrier 28. The carrier 28 can travel in a first direction 30 (e.g., a forward direction) and a second direction 32 (e.g., a rearward direction) (FIG. 4) in a longitudinal direction 34 along a track 36 to position the barrier 26 adjacent or near (e.g., just ahead of) a rear wheel 38 of the vehicle 12. Once the barrier 26 is positioned, the carrier 28 is latched onto the track 36 to substantially inhibit movement of the carrier 28 in the first direction 30. To secure or release the wheel 38, the barrier 26 is selectively moved in a lateral direction 40 between a blocking position (FIGS. 1 and 2) and a release position (FIG. 6). In the blocking position, the barrier 26 extends laterally into a wheel path 42 of the wheel 38 such that the wheel 38 is trapped, positioned or captured between the barrier 26 and the platform 22 as shown, for example, in FIGS. 1-3. To release the vehicle 12, the barrier 26 is withdrawn from within a wheel path 42, as shown in FIG. 6.

Although the details of the wheel restraint system 10 may vary in some examples, the track 36 of the illustrated example includes a lower section 36a anchored to the driveway 18 and an upper section 36b that has a plurality of discontinuities 44.

The purpose of the discontinuities 44, which will be explained later in greater detail, are to help hold the carrier 28 to a chosen or selected position along the track 36. Examples of the discontinuities 44 include, but are not limited to, notches, teeth, holes, pegs, pins and/or detents.

The carrier 28, in some examples, comprises a front end 28a, a back end 28b, and a base 28c extending between the front and back ends 28a and 28b. In the illustrated example, the base 28c rests upon and translates along the upper section 36b. In some examples, the front end 28a and the back end 28b include guides 46 for holding the carrier 28 in sliding engagement with the track 36. In some examples, the guides 46 include rollers to reduce friction between the carrier 28 and the track 36.

The barrier 26 of the illustrated example is generally L-shaped and has a wheel-blocking section 26a which is elongate in the lateral direction 40, an arm section 26b which is elongate in the longitudinal direction 34, and a heel section 26c between the wheel-blocking section 26a and the arm section 26b. In the illustrated example, the barrier 26 is rotatable about a pin 48 that connects the arm section 26b of the barrier 26 to the base 28c of the carrier 28. This allows the barrier 26 to pivot about a rotational axis 50 between the blocking and retracted positions of the barrier 26.

Figure 4:
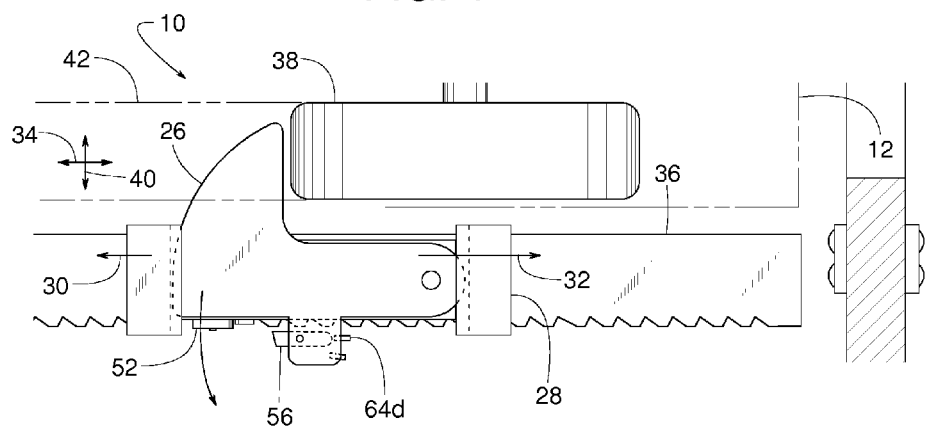
FIG. 4 is a top view similar to FIG. 2, but showing a carrier catch of an example wheel restraint in a release position and a barrier catch of the example wheel restraint in a second position.
Figure 5:
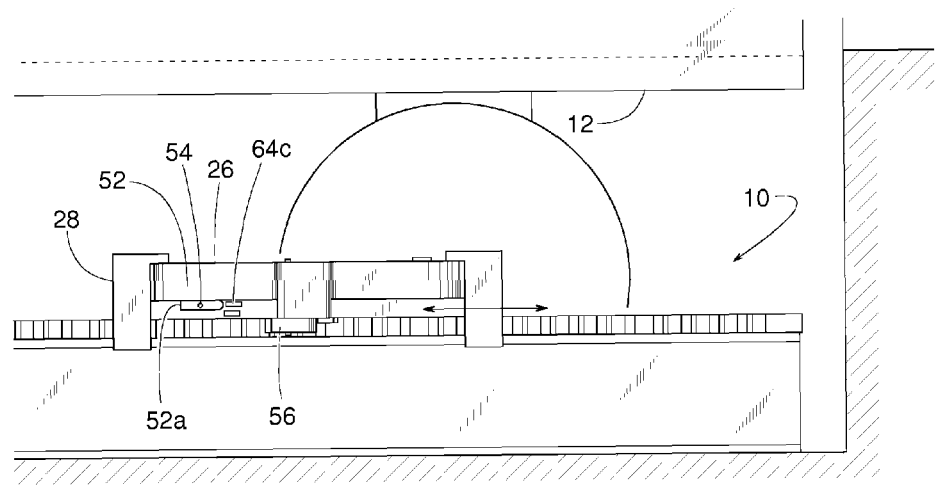
FIG. 5 is a front view of FIG. 4.

To help hold the barrier 26 at the blocking position, the wheel restraint system 10 of the illustrated example includes a barrier catch 52 attached to at least one of the barrier 26 and/or the carrier 28. In the example illustrated of FIGS. 1-6, a pin 54 connects the barrier catch 52 to the base 28c of the carrier 28. The barrier catch 52, in this example, is rotatable about the pin 54 between a first position (FIG. 2) and a second position (FIG. 4). In the first position, a front end 52a of the barrier catch 52 is elevated, as shown in FIG. 3, to obstruct the barrier 26 and prevent the barrier 26 from moving from the blocking position to the retracted position. In the second position, the front end 52a of the barrier catch 52 is below barrier 26, as shown in FIG. 5, to allow the barrier 26 to rotate from the blocking position to the release position.

When the barrier 26 is in the blocking position restraining the vehicle 12, a carrier catch 56 attached to at least one of the carrier 28 or the barrier 26 helps hold the carrier 28 and/or the barrier 26 at a position or location along the track 36. In the example illustrated in FIGS. 1-6, a pin 58 connects the carrier catch 56 to a projection 60 of the barrier 26. The carrier catch 56, in this example, is rotatable about the pin 58 between a holding position (FIG. 2) and a release position (FIG. 4). In the holding position, the carrier catch 56 engages one or more of the track discontinuities 44 to restrict movement of the carrier 28 along track 36, for example, the carrier catch 56 restricts the movement of the carrier 28 in the first direction 30. In the release position, the carrier catch 56 effectively releases the track discontinuities 44 to allow the carrier 28 to move back and forth along track 36 (e.g., in the first and second directions 30, 32), thereby allowing the carrier 28 and the barrier 26 to be repositioned to another location or position along the track 36.

The movements of the barrier and carrier catches 52, 56 can be driven by any suitable means. Examples of such means include, but are not limited to, manual force, spring force, gravity, an electromagnetic solenoid, electromotive (e.g., an electric motor), magnetic force, vehicular force (e.g., wheel 38 pressing against a portion of the wheel restraint), hydraulic force, pneumatic force, and/or various combinations thereof. In some examples, the means for moving a catch in a first direction is different than the means for moving the catch in the second direction opposite the first direction. In some examples the means for moving a catch in the first and second directions is the same. In some examples, the means for moving the barrier catch 52 is different than the means for moving the carrier catch 56. In some examples, the barrier catch 52 and the carrier catch 56 are moved by similar means. In some examples, the barrier and carrier catches 52, 56 move in various modes, examples of which include, but are not limited to, rotational, translational, laterally, vertically, horizontally and/or various combinations thereof.

Additionally or alternatively, the movements of the barrier 26 and the carrier 28 can be driven by any suitable means. Examples of such means include, but are not limited to, manual force, spring force, gravity, an electromagnetic solenoid, electromotive (e.g., an electric motor), magnetic force, vehicular force (e.g., the wheel 38 pressing against a portion of the wheel restraint 10), hydraulic force, pneumatic force, and/or various combinations thereof. In some examples, the means for moving the barrier 26 or the carrier 28 in a first direction is different than the means for moving the barrier 26 or the carrier 28 in a second direction opposite the first direction. In some examples, the means for moving the barrier 26 and the carrier 28 in the first and second directions is the same. In some examples, the means for moving the barrier 26 is different than the means for moving the carrier 28. In some examples, the barrier 26 and the carrier 28 are moved by similar means. In some examples, the barrier 26 and the carrier 28 move in various modes, examples of which include, but are not limited to, rotational, translational, laterally, vertically, horizontally and/or various combinations thereof.

In some examples, the operating sequence of the wheel restraint system 10 is as follows. First, the wheel restraint system 10 is in a stored position, as shown in FIG. 6, where the barrier 26 is in the retracted position, the barrier catch 52 is in the second position (FIG. 5), and the vehicle 12 backs into the dock 16 to place a rear edge 62 of the vehicle 12 adjacent the platform 22. Upon backing 64 into the dock 16, the wheel 38 travels (e.g., backward) along the wheel path 42 that is generally parallel to the track 36. Next, the carrier 28 is slid or otherwise moved along the track 36 to position the barrier 26 adjacent (e.g., just ahead) of the wheel 38. The barrier 26 is then rotated from the retracted position (FIG. 6) to the blocking position (FIGS. 1-5). To hold the carrier 28 at the position along track 36, the carrier catch 56 is rotated to the holding position to engage one or more of the discontinuities 44, as shown in FIGS. 1-3. To hold the barrier 26 at the blocking position, the barrier catch 52 is rotated to the first position, as shown in FIGS. 1-3. With the barrier 26 in the blocking position, the barrier catch 52 in the first position, the carrier 28 positioned to place wheel-blocking section 26a in front of the wheel 38, and the carrier catch 56 in the holding position, the wheel restraint system 10 restrains the vehicle 12 by capturing the wheel 38 between the barrier 26 and the platform 22. To release vehicle 12, the barrier catch 52 is moved from the first position (FIG. 3) to the second position (FIG. 5), and the barrier 26 is moved from the blocking position (FIG. 4) to the retracted position (FIG. 6).

To improve safety and proper use, some examples of the wheel restraint system 10 include one or more catch sensors 64 (e.g., a carrier catch sensor 64b, a carrier catch sensor 64d, a barrier catch sensor 64a and/or a barrier catch sensor 64c) and a signal indicator 66 for providing a visual signal 68 (e.g., a light such as a red visual signal 68a, a green visual signal 68b, a red visual signal 68c and/or a green visual signal 68d) that indicates the position of the carrier catch 56 and/or the barrier catch 52. The catch sensors 64 are schematically illustrated to represent any device for detecting the position of the barrier catch 52 or the carrier catch 56. Examples of the catch sensors 64 include, but are not limited to, a proximity switch, a Hall effect sensor, a magnetic resonance sensor, a photoelectric eye, an electromechanical limit switch, etc.

In some examples, the catch sensors 64 change state and provide a corresponding change in a catch signal (e.g., a barrier catch signal 70a, a barrier catch signal 70c, a carrier catch signal 70b, and a carrier catch signal 70d) upon sensing the respective barrier catch 52 or carrier catch 56 having changed position. The term, "state" refers to a sensor's character or condition that changes in response to sensing a change in the position of a catch, such as the barrier or carrier catches 52 or 56. Some examples of a sensor's change in state include, but are not limited to, electrical contacts opening, electrical contacts closing, an output voltage rising, an output current rising, an output voltage falling, an output current falling, electrical resistance rising, electrical resistance falling, electrical inductance rising, electrical inductance falling, etc.

In some examples, the barrier catch sensor 64a changes from a first state to a second state in response to the barrier catch 52 moving from a first position to a second position. In some examples, the barrier catch sensor 64a changes from the second state to the first state in response to the barrier catch 52 moving from the second position to the first position.

In some examples, the barrier catch sensor 64c changes from a first state to a second state in response to the barrier catch 52 moving from a first position to a second position. In some examples, the barrier catch sensor 64a changes from the second state to the first state in response to the barrier catch 52 moving from the second position to the first position.

In some examples, the carrier catch sensor 64b changes from a holding state to a release state in response to the carrier catch 56 moving from a holding position to a release position. In some examples, the carrier catch sensor 64b changes from the release state to the holding state in response to the carrier catch 56 moving from the release position to the holding position.

In some examples, the carrier catch sensor 64d changes from a holding state to a release state in response to the carrier catch 56 moving from a holding position to a release position. In some examples, the carrier catch sensor 64b changes from the release state to the holding state in response to the carrier catch 56 moving from the release position to the holding position.

In some examples, the wheel restraint system 10 includes the barrier catch sensor 64a and the carrier catch sensor 64b, where the barrier catch sensor 64a provides a barrier catch signal 70a that indicates whether the barrier catch 52 is in the first position shown in FIG. 2, and the carrier catch sensor 64b provides a carrier catch signal 70b that indicates whether the carrier catch 56 is in the holding position shown in FIG. 3. In some examples, a signal indicator 66 is operatively connected (e.g., via hard-wiring or via a wireless communication link 67) to the barrier catch sensor 64a and the carrier catch sensor 64b to receive the barrier catch signal 70a and the carrier catch signal 70b. Examples of the wireless communication link 67 include, but are not limited to, electromagnetic or radio waves, infrared, ultrasound, laser, etc. Wireless communication, in some examples, employ one or more communication protocols or standards, examples of which include, but are not limited to, Bluetooth, Wi-Fi, ZigBee, etc. In some examples, in response to receiving signals 70a and 70b indicating that both the barrier catch 52 is in the first position and the carrier catch 56 is in the holding position, the signal indicator 66 provides visual signals 68a and 68d, where the visual signal 68a provides, for example, a red light to personnel outside of a building at loading dock 16 (e.g., outdoor personnel) to indicate that the vehicle 12 is restrained, and the signal 68d provides, for example, a green light to personnel inside of the building at the loading dock 16 (e.g., indoor personnel) that the vehicle 12 is restrained, as shown in FIG. 2.

In addition or alternatively, in some examples, the wheel restraint system 10 includes the barrier catch sensor 64c and the carrier catch sensor 64d, where the barrier catch sensor 64c provides a barrier catch signal 70c that indicates whether the barrier catch 52 is in the second position shown in FIG. 5, and the carrier catch sensor 64d provides a carrier catch signal 70d that indicates whether the carrier catch 56 is in the release position shown in FIG. 4. The signal indicator 66, in this example, is operatively connected (e.g., via hard-wiring or wireless communication) to the barrier catch sensor 64c and the carrier sensor 64d to receive the barrier catch signal 70c and the carrier catch signal 70d. In some examples, in response to receiving the barrier catch signal 70c or the carrier catch signal 70d indicating that the barrier catch 52 is in the second position or the carrier catch 56 is in the release position, the signal indicator 66 provides visual signals 68b and 68c, where the visual signal 68b provides, for example, a green light to outdoor personnel that the vehicle 12 is not restrained, and the visual signal 68c provides, for example, a red light to indoor personnel that the vehicle 12 is not restrained, as shown in FIG. 6.

FIGS. 7-11 show an example vehicle restraint system 72 similar to the example vehicle restraint system 10 of FIGS. 1-6. However, with the vehicle restraint system 72, a carrier catch 74 is solidly or integrally attached to a projection 60 of the barrier 26, and the carrier catch 56 and the carrier catch sensors 64b and 64d are omitted. In this example, the carrier catch 74 is movable from a holding position (FIGS. 7 and 9) to a release position (FIG. 11) by moving the barrier catch 52 from a first position (FIG. 8) to a second position (FIG. 10) and then moving the barrier 26 from a blocking position (FIGS. 7 and 9) to a retracted position (FIG. 11).

Figure 7:
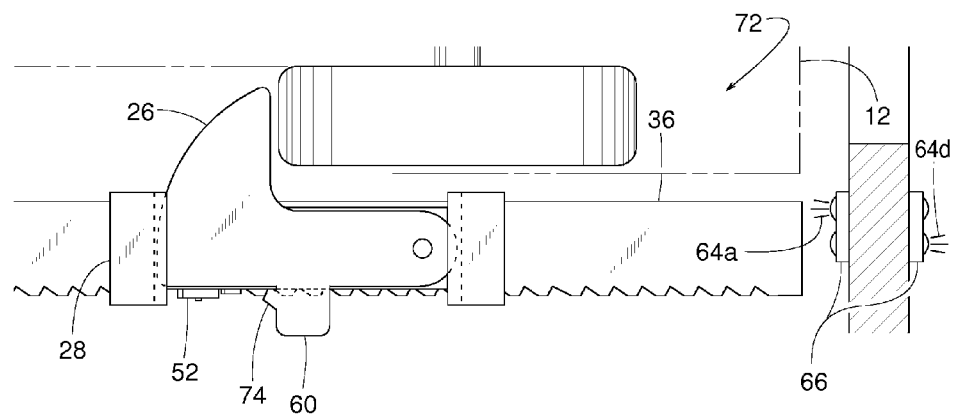
FIG. 7 is a top view similar to FIG. 2, but illustrating another example wheel restraint constructed according to the teachings disclosed herein.

In some examples, the wheel restraint system 72 includes the barrier catch sensor 64a and/or the barrier catch sensor 64c. In response to one or more signals from the barrier catch sensors 64a or 64c indicating that the barrier catch 52 is in the first position (FIG. 8), the signal indicator 66 provides visual signals 64a and 64d, where the visual signal 64a provides a red light to communicate to outdoor personnel that the vehicle 12 is restrained, and the signal 64d provides a green light to communicate to indoor personnel that the vehicle 12 is restrained, as shown in FIG. 7. In response to one or more signals from the visual sensors 64a or 64c indicating that the barrier catch 52 is in the second position (FIG. 10), the signal indicator 66 provides visual signals 68b and 68c, where the visual signal 68b provides a green light to communicate to outdoor personnel that the vehicle 12 is not restrained, and the visual signal 68c provides a red light to communicate to indoor personnel that vehicle 12 is not restrained, as shown in FIGS. 9-11.

FIGS. 12-16 show an example vehicle restraint system 76 similar to the example vehicle restraint system 10 of FIGS. 1-6. However, with the vehicle restraint system 76, a barrier catch 78 and corresponding barrier catch sensors 64a and/or 64c are mounted to a barrier 80, rather than to the carrier 28. Also, the carrier catch 56 and corresponding carrier catch sensors 64b and 64d are mounted to a carrier 82, instead of to the barriers 26 or 80.

Figure 14:
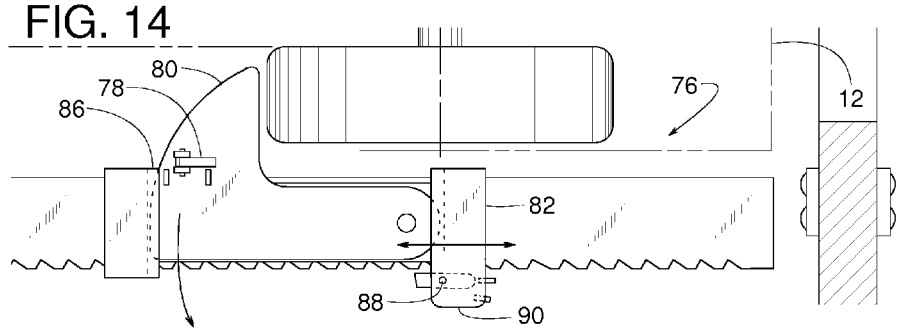
FIG. 14 is a top view similar to FIG. 12, but showing a carrier catch of the example wheel restraint of FIGS. 12 and 13 in a release position and a barrier catch of the example wheel restraint in a second position.
Figure 15:
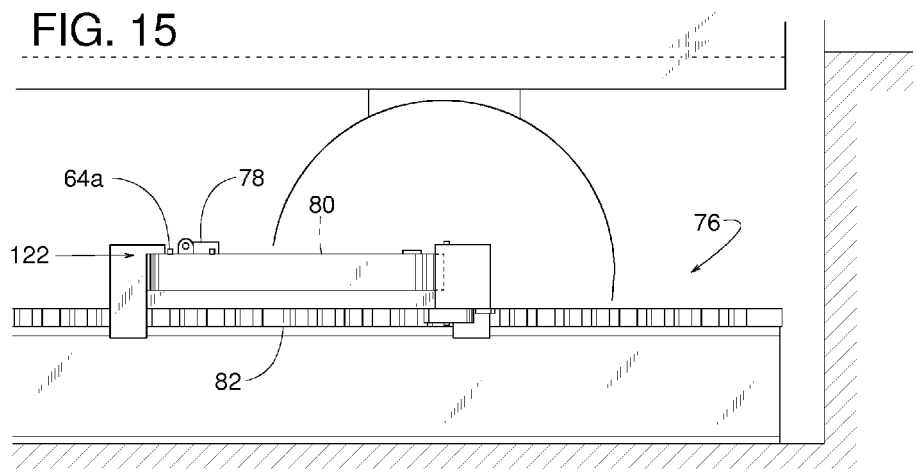
FIG. 15 is a front view of FIG. 14.
Figure 16:
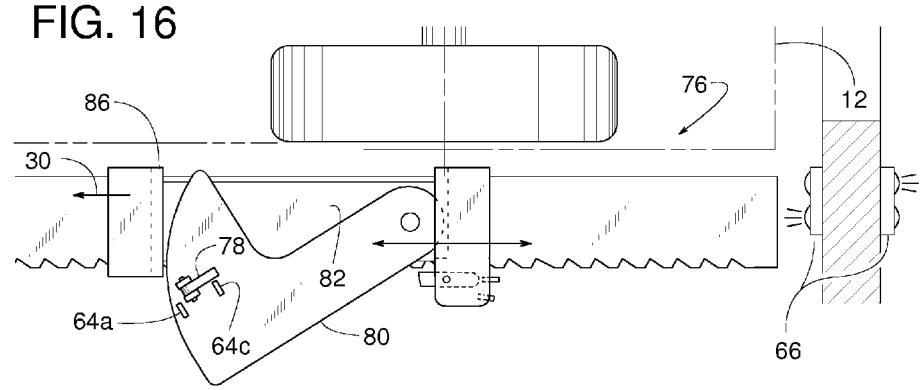
FIG. 16 is a top view similar to FIGS. 12 and 14, but showing the barrier in a retracted position.
Figure 17:
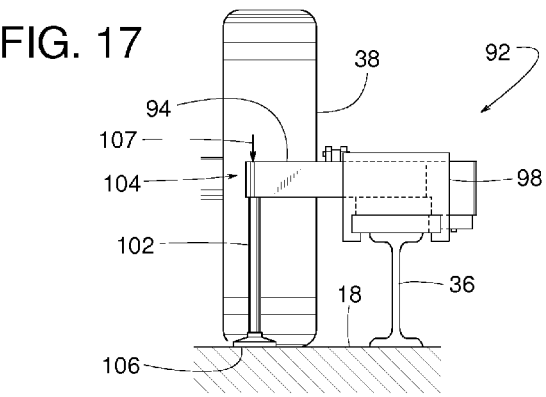
FIG. 17 is an end view of another example wheel restraint system constructed according to the teachings disclosed herein.
Figure 18:
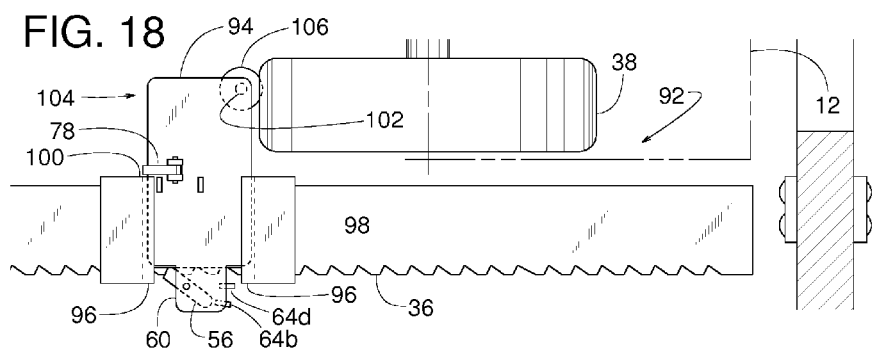
FIG. 18 is a top view of FIG. 17.
Figure 19:
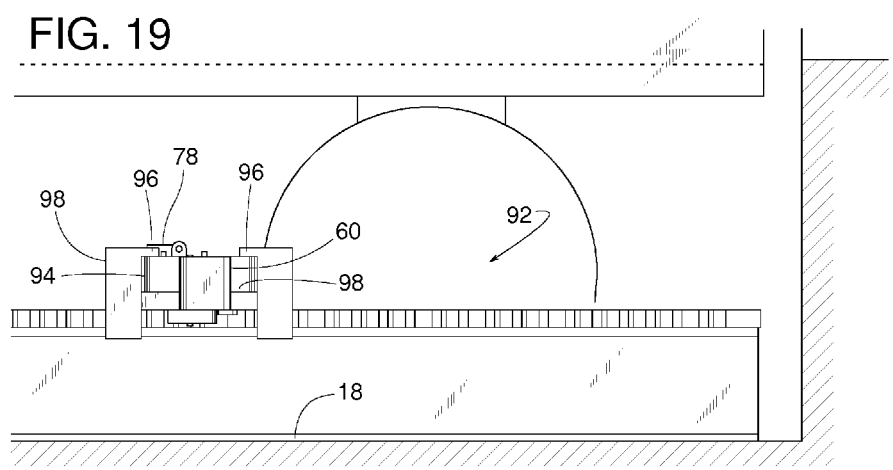
FIG. 19 is a front view of FIG. 18.

In this example, a pin 84 pivotally connects the barrier catch 78 to the barrier 80 such that the barrier catch 78 is pivotal between a first position (FIGS. 12 and 13) and a second position (FIGS. 14-16). In the first position, the barrier catch 78 engages a lateral edge 86 of the carrier 28 to prevent the barrier 80 from freely swinging from a blocking position (FIGS. 12 and 13) to a retracted position (FIG. 16). In the second position, the barrier catch 56 disengages the lateral edge 86 to allow the barrier 80 to rotate from the blocking position to the retracted position.

Also in this example, a pin 88 pivotally connects the carrier catch 56 to a projection 90 of the carrier 82 such that the carrier catch 56 is pivotal between a holding position (FIG. 12) and a release position (FIG. 14). In the holding position, the carrier catch 56 engages one or more of the discontinuities 44 of the track 36 to prevent the carrier 82 from moving in the first direction 30. In the release position, the carrier catch 56 effectively disengages the plurality of discontinuities 44 to allow repositioning of the carrier 82 and the barrier 80 along the track 36. In some examples, the signal indicator 66 works in conjunction with the catch sensors 64a, 64b, 64c and/or 64d in a manner similar to that of the example wheel restraint systems 10.

In another example, shown in FIGS. 17-22, a wheel restraint system 92 includes a wheel-blocking barrier 94 that slides within guide members 96 of a carrier 98. Instead of rotating, the barrier 94 translates laterally between a blocking position (FIGS. 17 and 18) and a retracted position (FIG. 22). To prevent the barrier 94 from being moved unintentionally to a retracted position, the barrier catch 78 is mounted to the barrier 94 in a mounting arrangement similar to that of the barrier 80 in FIG. 12, where the barrier catch 78 is movable between a first position (FIG. 18) and a second position (FIGS. 20 and 22). In the first position, the barrier catch 78 engages a lateral edge 100 of the carrier 98 to prevent the barrier 94 from moving from a blocking position (FIGS. 17 and 18) to a retracted position (FIG. 22). In the second position, the barrier catch 78 disengages the lateral edge 100 to allow the barrier 94 to translate from the blocking position to the retracted position.

The carrier catch 56, the carrier catch sensors 64b and 64d, and the protrusion 60 are similar in structure and function as their corresponding parts of the example wheel restraint system 10 shown in FIGS. 1-6. To position the barrier 94 relative to the wheel 38, the carrier catch 56 is moved from a holding position (FIG. 18) to a release position (FIG. 20), which allows the carrier 98 to translate along track 36 in a manner similar to the carrier 28 shown in FIGS. 1-11.

In some examples of the wheel restraint system 92, a vertical brace 102 extends downward from a distal end 104 of the barrier 94. In some examples, a lower end 106 of the brace 102 is normally or generally held slightly above or elevated relative to the driveway 18. However, if the wheel 38 exerts a significant downward force 107 against the distal end 104 of the barrier 94, the lower end 106 of the brace 102 abuts or engages driveway 18 so that the brace 102 then provides the barrier 94 with vertical support. In some examples, a vertical brace similar to the brace 102 is added to the tip or distal end of the other example barriers disclosed herein.

Figure 27:
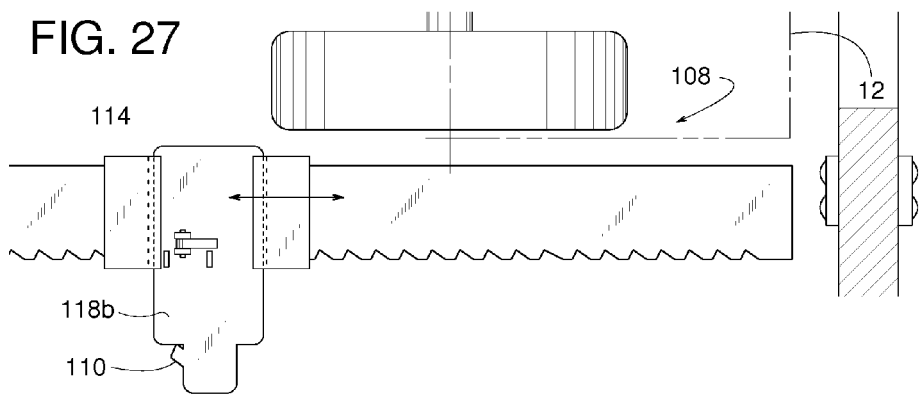
FIG. 27 is a top view similar to FIG. 26, but showing the barrier of the example wheel restraint of FIGS. 23-26 in a retracted position.
Figure 28:
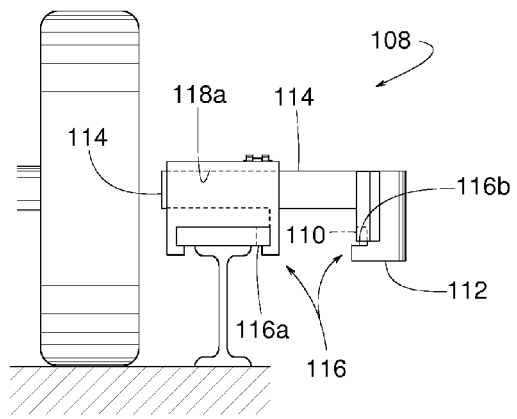
FIG. 28 is an end view of FIG. 27.

FIGS. 23-28 show a wheel restraint system 108 similar to the restraint 92 of FIGS. 17-22. However, there are a couple of differences. Instead of the pivotal carrier catch 56 (FIGS. 17-22), the wheel restraint system 108 of the illustrated example has a carrier catch 110 solidly or integrally attached to a projection 112 of a wheel-blocking barrier 114. The carrier catch 110 is similar in structure and functions similarly to the carrier catch 74 of FIGS. 7-11, whereby moving barrier 114 from a blocking position (FIGS. 23 and 25) to a retracted position (FIGS. 27 and 28) automatically moves the carrier catch 110 from a holding position (FIG. 25) to a release position (FIGS. 27 and 28).

Figure 23:
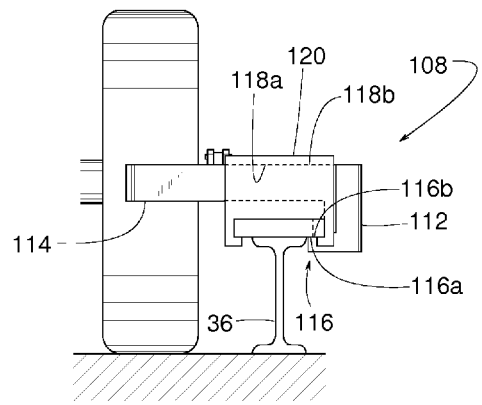
FIG. 23 is an end view of another example wheel restraint system constructed according to the teachings disclosed herein.
Figure 24:
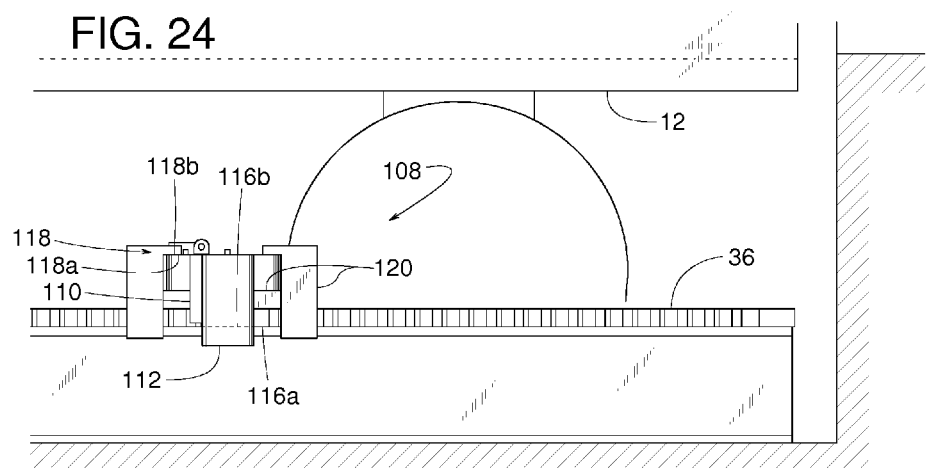
FIG. 24 is a right side view of FIG. 23.
Figure 25:
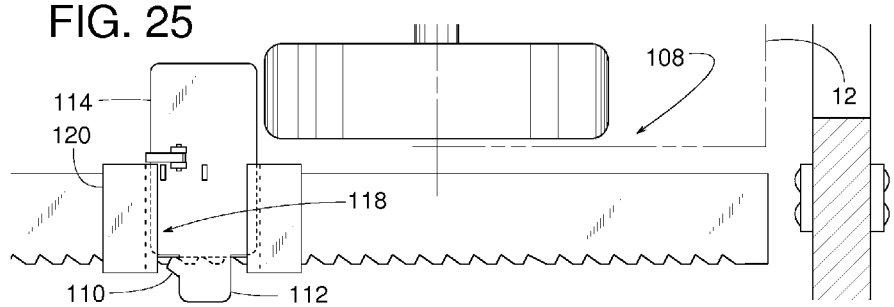
FIG. 25 is a top view of FIG. 24.
Figure 26:
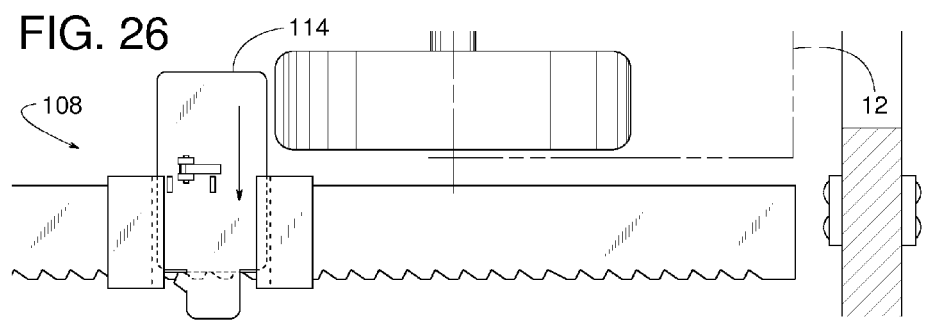
FIG. 26 is a top view similar to FIG. 25, but showing a barrier catch of the example wheel restraint of FIGS. 23-25 in a second position.

In addition or as an alternative to the vertical brace 102 of FIGS. 17-22, the wheel restraint system 108 of the illustrated example includes an example vertical retainer 116, which helps provide the barrier 114 with vertical support when the barrier 114 is in the blocking position (FIGS. 23-25). Various examples of vertical retainers disclosed herein include, for example, a downward facing surface and an upward facing surface, where the downward facing surface is disposed on at least one of the track or the carrier, and the upward facing surface is disposed on the wheel-blocking barrier such that the upward facing surface faces the downward facing surface at least when the barrier is in the blocking position.

In the example of wheel restraint system 108, shown in FIGS. 23-28, the vertical retainer 116 comprises a downward facing surface 116a on the track 36 and an upward facing surface 116b on the barrier 114. In this example, the upward and downward facing surfaces 116a and 116b face and engage each other when the barrier 114 is in the blocking position (FIG. 23), and the two surfaces 116a, 116b are spaced apart when the barrier 114 is in the retracted position (FIG. 28).

Figure 8:
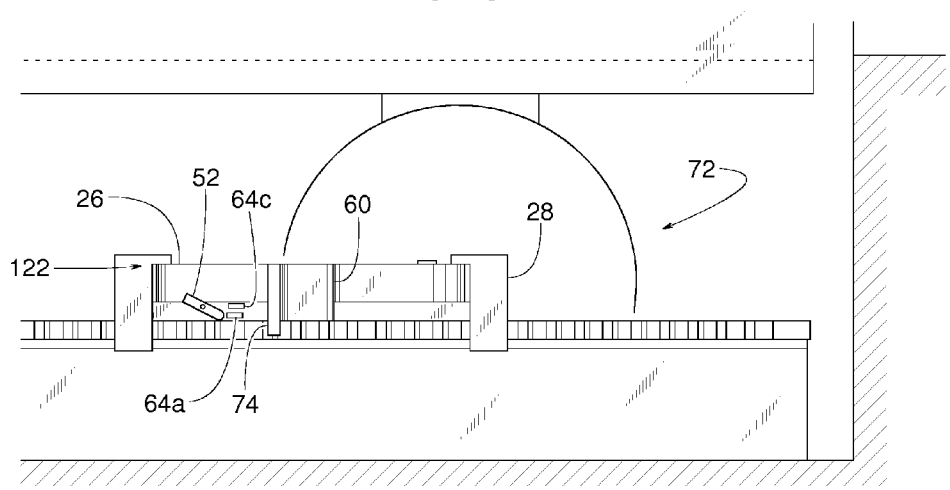
FIG. 8 is a front view of FIG. 7.
Figure 12:
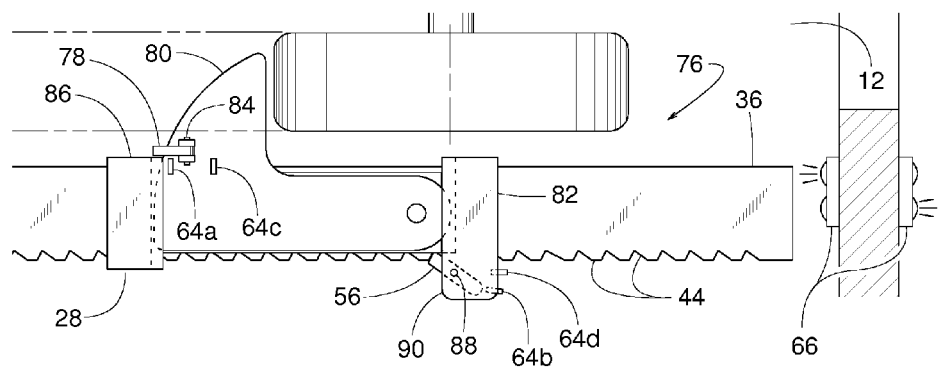
FIG. 12 is a top view similar to FIG. 2, but showing another example wheel restraint constructed according to the teachings disclosed herein.
Figure 13:
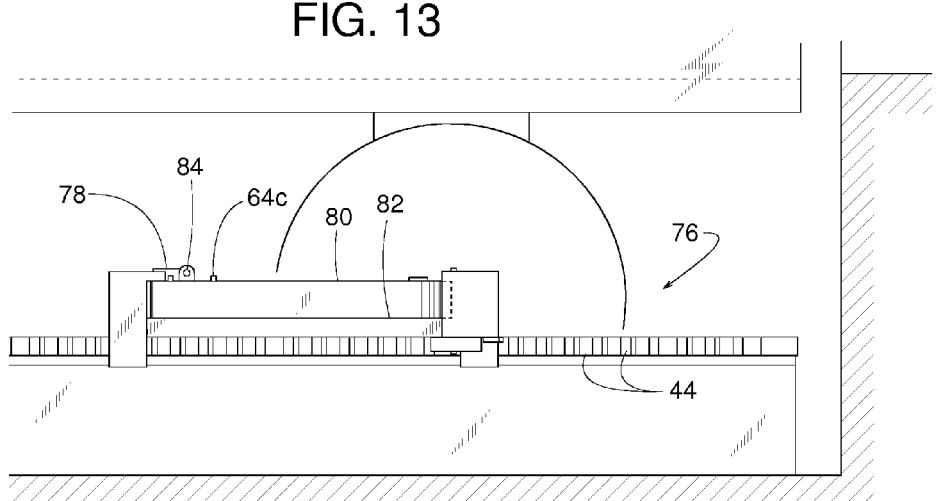
FIG. 13 is a front view of FIG. 12.

In addition or alternatively, the wheel restraint system 108 includes a vertical retainer 118 comprising a downward facing surface 118a on a carrier 120 and an upward facing surface 118b on the barrier 114. In this example, the surfaces 118a and 118b face and engage each other regardless of whether the barrier 114 is in the blocking or retracted position. Other example wheel restraint systems disclosed herein include vertical retainers similar or identical to vertical retainers 118 and/or 120. FIGS. 3, 8 and 15, for instance, show an example vertical retainer 122, and FIG. 21 shows an example vertical retainer 124.

As for an example wheel restraint method associated with one or more of the wheel restraints systems disclosed herein, arrow 126 in FIG. 6 represents manually moving the carrier 28 along the track 36. The arrow 128 in FIG. 2 represents moving the carrier catch 56 from a release position to a holding position. Symbol 130 in FIG. 2 represents the carrier catch 56 restricting movement of the carrier 28 along the track 36 when the carrier catch 56 is in the holding position. The sensor 64b being shown proximate to the carrier catch 56 represents sensing that the carrier catch 56 is in the holding position. In FIG. 2, arrow 70b by dashed line 132 represents electrically providing a carrier catch signal to indicate that the carrier catch 56 is in the holding position. In FIG. 2, dashed line 132 being next to arrow 70b represents transmitting a carrier catch signal to the signal indicator 66. In FIG. 2, lines 68a and 68d, in some examples, represent the signal indicator 66 providing a visual signal indicative of whether the carrier catch 56 is in the holding position. In FIG. 3, arrow 136 represents moving the barrier catch 52 from a second position to a first position. In FIG. 2, the symbol 138 represents the barrier catch 52 limiting movement of the wheel-blocking barrier 26 when the barrier catch 52 is in the first position. In FIG. 3, the sensor 64a being shown proximate to barrier catch 52 represents sensing that the barrier catch 52 is in the first position. In FIG. 2, the arrow 70a by dashed line 134 represents electrically providing a barrier catch signal that indicates that the barrier catch 52 is in the holding position. In FIG. 2, dashed line 134 being next to arrow 70a and dashed line 132 being next to arrow 70b represents transmitting a carrier catch signal and a barrier catch signal to the signal indicator 66. In FIG. 2, lines 68a and 68d, in some examples, represent the signal indicator 66 providing a visual signal indicative of whether both the carrier catch 56 is in the holding position and the barrier catch 52 is in the first position.

Additional points worth noting include the following. The term, "track" refers to the overall structure along which the carrier travels. Some portions of the track are untouched by the carrier, for example, the carrier does not necessarily touch the track's plurality of discontinuities. The expression, "the carrier catch in the release position effectively releasing the track discontinuity" means that the carrier's movement is no longer significantly restricted or limited by the carrier catch even though the carrier catch, in some examples, might still be touching a track discontinuity. The expression, "the carrier and the barrier are manually moved as opposed to being power driven," means that the carrier and the barrier are moved by human power alone without mechanical assistance (i.e., are not moved by a hydraulic cylinder, a pneumatic cylinder, a motor nor other powered means). The expression, "the carrier catch restricting movement of the carrier along the track when the carrier catch is in the holding position," means that the carrier's movement is limited in some manner or in some direction, but does not necessarily mean that all movement is prevented. The term, "pin" refers to a connector that facilitates one part rotating relative to another part. Some pins include an enlarged head, shoulder or key that helps hold the two parts together in an axial direction with respect to the pin. Example pins include, but are not limited to, a screw, a threaded rod with a nut, a shaft, a rod, etc.

Although certain example methods, apparatus and articles of manufacture have been described herein, the scope of the coverage of this patent is not limited thereto. On the contrary, this patent covers all methods, apparatus and articles of manufacture fairly falling within the scope of the claims of this patent either literally or under the doctrine of equivalents.

The invention claimed is:

1. A wheel restraint system for use at a loading dock area that has wheel path along which a wheel of a vehicle can travel, the wheel restraint system comprising:
    a track extending in a longitudinal direction proximate the wheel path, the track having a plurality of track discontinuities;
    a carrier mounted to travel in the longitudinal direction along the track;
    a wheel-blocking barrier attached to the carrier, the wheel-blocking barrier having selectively a blocking position and a retracted position, the wheel-blocking barrier in the blocking position extending in a lateral direction into the wheel path, the lateral direction being displaced out of parallel alignment with the longitudinal direction, the wheel-blocking barrier in the retracted position being withdrawn from the wheel path;
    a carrier catch connected to at least one of the carrier or the wheel-blocking barrier, the carrier catch having a holding position and a release position, the carrier catch in the holding position engaging one or more of the track discontinuities to restrict movement of the carrier in the longitudinal direction relative to the track, the carrier catch in the release position effectively releasing the one or more track discontinuities to allow movement of the carrier in the longitudinal direction relative to the track;
    a barrier catch connected to at least one of the carrier or the wheel-blocking barrier, the barrier catch having a first position and a second position, the barrier catch in the first position engaging at least one of the carrier, the wheel-blocking barrier or the track to restrict movement of the wheel-blocking barrier in the lateral direction, the barrier catch in the second position effectively releasing at least one of the carrier, the wheel-blocking barrier, and the track to allow movement of the wheel-blocking barrier in the lateral direction; and
    a carrier catch sensor associated with the carrier catch, the carrier catch sensor being selectively in at least one of a holding state or a release state, the carrier catch sensor being in the holding state in response to the carrier catch being in the holding position, the carrier catch sensor being in the release state when the carrier catch is in the release position, the carrier catch sensor providing a carrier catch signal that indicates at least one of the holding state or the release state.

2. The wheel restraint system of claim 1, further comprising a barrier catch sensor associated with the barrier catch, the barrier catch sensor being selectively in at least one of a first state or a second state, the barrier catch sensor being in the first state in response to the barrier catch being in the first position, the barrier catch sensor being in the second state in response to the barrier catch being in the second position, the barrier catch sensor providing a barrier catch signal that indicates at least one of the first state or the second state.

3. The wheel restraint system of claim 2, further comprising a signal indicator operatively connected to the carrier catch sensor and the barrier catch sensor to receive the carrier catch signal and the barrier catch signal, the signal indicator in response to the carrier catch signal and the barrier catch signal providing a visual signal indicative of whether both the carrier catch is in the holding position and the barrier catch is in the first position.

4. The wheel restraint system of claim 1, further comprising a signal indicator operatively connected to the carrier catch sensor to receive the carrier catch signal, the signal indicator to provide a visual signal indicative of whether the carrier catch is in the holding position.

5. The wheel restraint system of claim 1, further comprising a signal indicator operatively connected to the carrier catch sensor to receive the carrier catch signal, and in response to the carrier catch signal, the signal indicator to provide a visual signal indicative of whether the carrier catch is in the release position.

6. The wheel restraint system of claim 1, further comprising:
    a signal indicator; and
    a wireless communication link operatively connecting the signal indicator to the carrier catch sensor, the signal indicator to provide a visual signal in response to the carrier catch signal being transmitted over the wireless communication link.

7. The wheel restraint system of claim 1, wherein the wheel-blocking barrier translates between the blocking position and the retracted position.

8. The wheel restraint system of claim 1, wherein the wheel-blocking barrier rotates between the blocking position and the retracted position.

9. The wheel restraint of claim 8, wherein the wheel-blocking barrier comprises an arm section, a wheel-blocking section, and a heel section between the arm section and the wheel-blocking section, the arm section defining a rotational axis about which the wheel-blocking barrier rotates between the blocking position and the retracted position, the wheel-blocking section being elongate in the lateral direction, the arm section being elongate in the longitudinal direction between the rotational axis and the heel section, the wheel restraint further comprising:
    a vertical retainer comprising a downward facing surface and an upward facing surface, the downward facing surface being disposed on at least one of the track and the carrier, the upward facing surface being disposed on the heel section of the wheel-blocking barrier, the upward facing surface facing the downward facing surface when the wheel-blocking barrier is in the blocking position.

10. The wheel restraint of claim 9, wherein the upward facing surface engages the downward facing surface when the wheel-blocking barrier is in the blocking position.

11. The wheel restraint of claim 9, wherein the upward facing surface is spaced apart from the downward facing surface when the wheel-blocking barrier is in the refracted position.

12. The wheel restraint of claim 9, wherein the downward facing surface is on the track.

13. The wheel restraint of claim 9, wherein the downward facing surface is on the carrier.

14. The wheel restraint of claim 1, wherein the plurality of track discontinuities comprise teeth.

15. The wheel restraint of claim 1, wherein the carrier and the wheel-blocking barrier are to be manually moved.

16. The wheel restraint of claim 1, wherein the carrier catch pivots between the holding position and the release position.

17. A wheel restraint system for use at a loading dock area that has wheel path along which a wheel of a vehicle can travel, the wheel restraint system comprising:
  a track extending in a longitudinal direction proximate the wheel path, the track having a plurality of track discontinuities;
  a carrier mounted to travel in the longitudinal direction along the track;
  a wheel-blocking barrier attached to the carrier, the wheel-blocking barrier having selectively at least one of a blocking position or a retracted position, the wheel-blocking barrier in the blocking position extending in a lateral direction into the wheel path, the lateral direction being displaced out of parallel alignment with the longitudinal direction, the wheel-blocking barrier in the retracted position being withdrawn from the wheel path;
  a carrier catch connected to at least one of the carrier or the wheel-blocking barrier, the carrier catch having selectively at least one of a holding position or a release position, the carrier catch in the holding position engaging a track discontinuity of the plurality of track discontinuities to restrict movement of the carrier in the longitudinal direction relative to the track, the carrier catch in the release position effectively releasing the track discontinuity to allow movement of the carrier in the longitudinal direction relative to the track;
  a barrier catch connected to at least one of the carrier or the wheel-blocking barrier, the barrier catch having selectively at least one of a first position or a second position, the barrier catch in the first position engaging at least one of the carrier, the wheel-blocking barrier or the track to restrict movement of the wheel-blocking barrier in the lateral direction relative to the track, the barrier catch in the second position effectively releasing at least one of the carrier, the wheel-blocking barrier or the track to allow movement of the wheel-blocking barrier in the lateral direction relative to the track; and
  a barrier catch sensor associated with the barrier catch, the barrier catch sensor being selectively at least one of in a first state or a second state, the barrier catch sensor being in the first state in response to the barrier catch being in the first position, the barrier catch sensor being in the second state in response to the barrier catch being in the second position, the barrier catch sensor providing a barrier catch signal that indicates at least one of the first state or the second state.

18. The wheel restraint system of claim 17, further comprising a signal indicator operatively connected to the barrier catch sensor to receive the barrier catch signal, the signal indicator to provide a visual signal indicative of whether the barrier catch is in the first position.

19. The wheel restraint system of claim 17, further comprising a signal indicator operatively connected to the barrier catch sensor to receive the barrier catch signal, and in response to the barrier catch signal, the signal indicator to provide a visual signal indicative of whether the barrier catch is in the second position.

20. The wheel restraint system of claim 17, further comprising:
  a signal indicator; and
  a wireless communication link operatively connecting the signal indicator to the barrier catch sensor, the signal indicator to provide a visual signal in response to the barrier catch signal being transmitted over the wireless communication link.

21. The wheel restraint system of claim 17, wherein the wheel-blocking barrier translates between the blocking position and the retracted position.

22. The wheel restraint system of claim 17, wherein the wheel-blocking barrier rotates between the blocking position and the retracted position.

23. The wheel restraint of claim 22, wherein the wheel-blocking barrier comprises an arm section being elongate in the longitudinal direction, a blocking section being elongate in the lateral direction, and a heel section between the arm section and the blocking section, the arm section defining a rotational axis about which the wheel-blocking barrier rotates between the blocking position and the retracted position, the wheel restraint further comprising:
  a vertical retainer comprising a downward facing surface and an upward facing surface, the downward facing surface being disposed on at least one of the track or the carrier, the upward facing surface being disposed on the heel section of the wheel-blocking barrier, the upward facing surface facing the downward facing surface when the wheel-blocking barrier is in the blocking position.

24. The wheel restraint of claim 23, wherein the upward facing surface engages the downward facing surface when the wheel-blocking barrier is in the blocking position.

25. The wheel restraint of claim 23, wherein the upward facing surface is spaced apart from the downward facing surface when the wheel-blocking barrier is in the refracted position.

26. The wheel restraint of claim 23, wherein the downward facing surface is on the track.

27. The wheel restraint of claim 23, wherein the downward facing surface is on the carrier.

28. The wheel restraint of claim 17, wherein the plurality of track discontinuities comprise teeth.

29. The wheel restraint of claim 17, wherein the carrier and the wheel-blocking barrier are to be manually moved.

30. The wheel restraint of claim 17, wherein the barrier catch is pivotal between the first position and the second position.

31. A wheel restraint method comprising:
  manually moving a carrier having a wheel-blocking barrier along a track extending in a longitudinal direction proximate a wheel path, the track having a plurality of track discontinuities;
  moving a carrier catch connected to at least one of the carrier or the wheel-blocking barrier between a release position and a holding position, the carrier catch to engage a track discontinuity of the plurality of track discontinuities to restrict movement of the carrier along the track in the longitudinal direction when the carrier catch is in the holding position; and providing a carrier catch signal to indicate that the carrier catch is in the holding position, in response to sensing the carrier catch is in the holding position.

32. The wheel restraint method of claim 31, further comprising:

transmitting the carrier catch signal to a signal indicator; and the signal indicator providing a visual signal indicative of whether the carrier catch is in the holding position.

33. The wheel restraint method of claim 32, wherein transmitting the carrier catch signal to the signal indicator comprises using a wireless communication.

34. The wheel restraint method of claim 31, further comprising:

moving a barrier catch between a second position and a first position, the barrier catch to limit movement of the wheel-blocking barrier when the barrier catch is in the first position and the barrier catch to allow movement of the wheel-blocking barrier when the barrier catch is in the second position; and providing a barrier catch signal to indicate that the barrier catch is in the first position, in response to sensing the barrier catch is in the first position.

35. The wheel restraint method of claim 34, further comprising:

transmitting the carrier catch signal and the barrier catch signal to a signal indicator; and providing via the signal indicator a visual signal indicative of both the carrier catch being in the holding position and the barrier catch being in the first position.

36. A wheel restraint method comprising:

manually moving a carrier along a track, the carrier having a wheel-blocking barrier;

moving a carrier catch from a release position to a holding position, the carrier catch to restrict movement of the carrier along the track when the carrier catch is in the holding position;

moving a barrier catch from a second position to a first position, the barrier catch to limit movement of the wheel-blocking barrier when the barrier catch is in the first position; and providing a barrier catch signal to indicate that the barrier catch is in the first position, in response to sensing the barrier catch is in the first position.

37. The method of claim 36, wherein the track comprises a plurality of track discontinuities, and further comprising the carrier catch engaging a track discontinuity of the plurality of track discontinuities when the carrier catch is in the holding position.

* * * * *